US007722951B2

(12) United States Patent
Li et al.

(10) Patent No.: US 7,722,951 B2
(45) Date of Patent: May 25, 2010

(54) INSULATOR COATING AND METHOD FOR FORMING SAME

(75) Inventors: Jun Li, Atlanta, GA (US); Lianhua Fan, Atlanta, GA (US); Ching-Ping Wong, Berkeley Lake, GA (US); Franklin Cook Lambert, Palmetto, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1239 days.

(21) Appl. No.: 10/966,963

(22) Filed: Oct. 15, 2004

(65) Prior Publication Data

US 2006/0081394 A1 Apr. 20, 2006

(51) Int. Cl.
*B32B 15/00* (2006.01)

(52) U.S. Cl. ....................... 428/379; 428/375; 428/372; 428/399; 428/400; 174/40 R; 174/113 R; 174/137 R

(58) Field of Classification Search ................. 428/375, 428/379, 389, 383; 174/137 R, 137 B
See application file for complete search history.

(56) References Cited

U.S. PATENT DOCUMENTS

| | | | | |
|---|---|---|---|---|
| 3,324,223 | A * | 6/1967 | Bollmeier | 174/30 |
| 3,354,022 | A * | 11/1967 | Johnson, Jr. et al. | 428/167 |
| 3,764,280 | A | 10/1973 | Lupinski | |
| 4,011,168 | A * | 3/1977 | Uhlmann | 252/572 |
| 4,177,322 | A * | 12/1979 | Homan et al. | 428/447 |
| 4,206,066 | A * | 6/1980 | Rinehart | 523/427 |
| 4,476,155 | A * | 10/1984 | Niemi | 427/58 |
| 4,617,057 | A * | 10/1986 | Plueddemann | 106/2 |
| 5,041,164 | A * | 8/1991 | Hingorani | 134/22.12 |
| 5,223,030 | A | 6/1993 | Vallette et al. | |
| 5,313,823 | A * | 5/1994 | Berkman et al. | 73/40 |
| 5,603,983 | A | 2/1997 | Clough et al. | |
| 5,798,455 | A | 8/1998 | Sakata et al. | |
| 5,902,963 | A | 5/1999 | Chappaz et al. | |
| 6,139,613 | A | 10/2000 | Hendrickson et al. | |
| 6,303,870 | B1 * | 10/2001 | Nazaryan et al. | 174/172 |
| 6,340,497 | B2 | 1/2002 | Wilson et al. | |

(Continued)

FOREIGN PATENT DOCUMENTS

CH 268258 A 4/1950

(Continued)

OTHER PUBLICATIONS

Lobnik, A. and Wolfbeis, O.S.; "Probing the Polarity of Sol-Gels and Ormosils Via the Absorption of Nile Red;" Journal of Sol-Gel Science and Technology 20; 2001; pp. 303-311.

(Continued)

*Primary Examiner*—Jill Gray
(74) *Attorney, Agent, or Firm*—Troutman Sanders LLP; Ryan A Schneider; James H Yancey, Jr.

(57) ABSTRACT

The present invention is a method of applying Lotus Effect materials as a (superhydrophobicity) protective coating for external electrical insulation system applications, as well as the method of fabricating/preparing Lotus Effect coatings. Selected inorganic or polymeric materials are applied on the insulating material surface, and stable superhydrophobic coatings can be fabricated. Various UV stabilizers and UV absorbers can be incorporated into the coating system to enhance the coating's UV stability.

43 Claims, 1 Drawing Sheet

U.S. PATENT DOCUMENTS

| | | | | |
|---|---|---|---|---|
| 6,352,758 | B1 | 3/2002 | Huang et al. | |
| 6,504,092 | B1 | 1/2003 | Morooka | |
| 6,541,118 | B2 * | 4/2003 | Baalmann et al. | 428/447 |
| 6,563,053 | B2 | 5/2003 | Petrenko | |
| 6,660,363 | B1 * | 12/2003 | Barthlott | 428/141 |
| 6,699,330 | B1 | 3/2004 | Muraoka | |
| 6,734,250 | B2 * | 5/2004 | Azechi et al. | 524/588 |
| 6,855,274 | B1 | 2/2005 | Marks et al. | |
| 6,872,441 | B2 | 3/2005 | Baumann et al. | |
| 2002/0048679 | A1 * | 4/2002 | Lohmer et al. | 428/447 |
| 2002/0049274 | A1 * | 4/2002 | Azechi et al. | 524/440 |
| 2002/0079127 | A1 * | 6/2002 | Miyakawa et al. | 174/110 R |
| 2002/0142150 | A1 | 10/2002 | Baumann et al. | |
| 2002/0150723 | A1 | 10/2002 | Oles et al. | |
| 2002/0164443 | A1 * | 11/2002 | Oles et al. | 428/35.7 |
| 2003/0024726 | A1 | 2/2003 | Petrenko | |
| 2003/0082237 | A1 | 5/2003 | Cha et al. | |
| 2003/0152780 | A1 | 8/2003 | Baumann et al. | |
| 2003/0183804 | A1 | 10/2003 | Martin et al. | |
| 2004/0258611 | A1 | 12/2004 | Barrow et al. | |
| 2005/0136217 | A1 | 6/2005 | Barthlott et al. | |
| 2005/0245634 | A1 | 11/2005 | Soutar et al. | |
| 2006/0019114 | A1 | 1/2006 | Thies et al. | |
| 2006/0029808 | A1 * | 2/2006 | Zhai et al. | 428/412 |
| 2006/0042510 | A1 | 3/2006 | Craig | |
| 2008/0015298 | A1 * | 1/2008 | Xiong et al. | 524/432 |

FOREIGN PATENT DOCUMENTS

| | | | | |
|---|---|---|---|---|
| DE | 19835916 | A1 | | 2/2000 |
| DE | 19944954 | A1 | | 3/2001 |
| DE | 10126117 | A1 | | 12/2002 |
| EP | 0 834 352 | A1 | | 4/1998 |
| JP | 62191447 | A | * | 8/1987 |
| WO | WO 99/32235 | | | 7/1999 |
| WO | WO 03/080258 | A2 | | 10/2003 |

OTHER PUBLICATIONS

Shang et al.; "Optically Transparent Superhydrophobic Silica-based Films;" Thin Solid Films 472; 2005; pp. 37-43 (available online Jul. 14, 2004).

Cao, G. and Tian, H.; "Synthesis of Highly Porous Organic/Inorganic Hybrids by Ambient Pressure Sol-Gel Processing;" Journal of Sol-Gel Sci. Tech. 13; 1998; pp. 305-309.

International Search Report and Written Opinion for Co-Pending PCT Application No. PCT/US2006/048992 dated Sep. 17, 2007.

Xiu, Yonghao et al.; "Superhydrophobic Durable Silica Thin Films from Sol-Gel Processing for the Application in Antistiction of MEMS Devices;" School of Chemical and Biomolecular Engineering; School of Materials Science and Engineering.

Xiu, Yonghao et al.; "Superhydrophobic Durable Self-Cleaning Surfaces from Sol-Gel Processing;" School of Chemical and Biomolecular Engineering; School of Materials Science and Engineering.

Xiu, Yonghao et al.; "Superhydrophobic Silicone/PTFE Films for Biocompatible Application in Encapsulation of Implantable Microelectronics Devices;" School of Chemical and Biomolecular Engineering; School of Materials Science and Engineering; Georgia Institute of Technology.

Xiu, Yonghao et al.; "Coprecursor Approach to the Fabrication of Superhydrophobic Durable Self-Cleaning Films;" School of Chemical and Biomolecular Engineering; School of Materials Science and Engineering, Georgia Institute of Technology.

Xiu, Yonghao et al.; "Biomimetic Creation of Hierarchical Surface Structures by Combining Colloidal Self-Assembly and Au Sputter Deposition;" Departments of Chemical and Biomolecular Engineering and of Materials Science and Engineering; Georgia Institute of Technology; American Chemical Society; Oct. 5, 2006; pp. 9676-9681.

Li, Jun et al.; "Lotus Effect Coating and its Application for Microelectromechanical Systems Stiction Prevention;" School of Material Science and Engineering; NSF Packaging Research Center; Electronic Components and Technology Conference; 2004; pp. 943-947.

Xiu, Yonghao et al.; "Superhydrophobic Silicone/PTFE Films for Biocompatible Application in Encapsulation of Implantable Microelectronics Devices;" School of Chemical and Biomolecular Engineering; School of Materials Science and Engineering; Georgia Institute of Technology.

Xiu, Yonghao et al.; "Superhydrophobicity and UV Stability of Polydimethylsiloxane/Polytetrafluroethylene (PDMS/PTFE) Coatings;" School of Chemical and Biomolecular Engineering; School of Materials Science and Engineering; Georgia Institute of Technology.

Supplementary European Search Report for EPO Application No. EP 05812747, Prepared by European Patent Office, Dated Jul. 16, 2009.

Takeshita et al., "Simultaneous Tailoring of Surface Topography and Chemical Structure for Controlled Wettability," Langmuir 2004, 20, 8131-8136.

Hikita et al., "Super-Liquid-Repellant Surfaces Prepared by Collodial Silica Nanoparticles Covered with Fluoroalkyl Groups," Langmuir 2005, 21, 7299-7302.

EPO Office Action Issued by the European Patent Office for EPO Application No. 05812747 dated Nov. 27, 2009 (referring to Jul. 16, 2009 EPO Search Report).

USPTO Office Action Issued by the US Patent & Trademark Office Action for U.S. Appl. No. 11/610,111 dated Sep. 11, 2009.

USPTO Office Action Issued by the US Patent & Trademark Office Action for U.S. Appl. No. 11/610,111 dated Feb. 25, 2009.

USPTO Office Action Issued by the US Patent & Trademark Office Action for U.S. Appl. No. 11/610,111 dated Sep. 15, 2008.

Cao et al., "Synthesis of Highly Porous Organic/Inorganic Hybrids by Ambient Pressure Sol-gel Processing," J. Sol-Gel Sci. Tech. 13 (1998), 305-309.

Shang, "Optically Transparent Superhydrophobic Silica-based Films," Thin Solid Films 472 (2005) p. 37-43; available online Jul. 14, 2004.

International Search Report and Written Opinion for corresponding PCT Application No. PCT/US2005/036993 dated Sep. 25, 2007.

Kobayashi, S. et al., "Development of Composite Insulators for Overhead Lines," Furukawa Review, No. 19, 2000.

* cited by examiner

INSULATOR COATING AND METHOD FOR FORMING SAME

BACKGROUND OF THE INVENTION

1. Field of the Invention

This invention relates generally to the field of insulator coatings, and specifically to a superhydrophobic surface coating for use as a protective coating for power systems.

2. Description of Related Art

Conventional high-voltage devices such as bushings, connectors, and capacitors use a combination of non-conductive and conductive materials to construct desired high-voltage structures. The nonconductive materials provide a dielectric barrier or insulator between two electrodes of different electrical potential.

The bulk of power delivery from the generating sites to the load centers is accomplished by overhead lines. To minimize line losses, power transmission over such long distances is more often carried out at high voltages (several hundred kV). The energized high voltage (HV) line conductors not only have to be physically attached to the support structures, but also the energized conductors have to be electrically isolated from the support structures. The device used to perform the dual functions of support and electrical isolation is the insulator.

High voltage insulators are used with transmission and distribution systems, including power transmission lines, for example at locations where the lines are suspended. Known insulators include ceramics, glass and polymeric materials. Ceramic and glass insulators have been used for over 100 years. The widespread use of polymeric insulators began in North America during the 1970s. A currently popular line of insulators are room temperature vulcanized (RTV) silicone rubber high voltage insulator coatings.

Ceramic insulators generally include clay ceramics, glasses, porcelains, and steatites. The ceramic is produced from the starting materials kaolin, quartz, clay, alumina and/or feldspar by mixing the same while adding various substances in a subsequent firing or sintering operation. Polymeric materials include composites (EPDM rubber and Silicone rubber) and resins.

A wide variety of manufacturing techniques can be employed to construct insulators of the desired shape. Some of the processes that are most often used include machining, molding, extrusion, casting, rolling, pressing, melting, painting, vapor deposition, plating, and other free-forming techniques, such as dipping a conductor in a liquid dielectric or filling with dielectric fluid. The selection process must take into account how one or both of the electrodes made from conductive material will be attached or adjoined to the insulator.

In long-term use, an insulator is subject to a greater or lesser degree of superficial soiling, depending on the location at which it is used, which can considerably impair the original insulating characteristics of the clean insulator. Such soiling is caused for example by the depositing of industrial dust or salts or the separating out of dissolved particles during the evaporation of moisture precipitated on the surface. In many parts of the world, insulator contamination has become a major impediment to the supply of electrical power. Contamination on the surface of insulators gives rise to leakage current, and if high enough, flashover.

One problem afflicting high voltage insulators used with transmission and distribution systems includes the environmental degradation of the insulators. Insulators are exposed to environment pollutants from various sources. It can be recognized that pollutants that become conducting when moistened are of particular concern. Two major sources of environmental pollution include coastal pollution and industrial pollution.

Coastal pollution, including salt spray from the sea or wind-driven salt-laden solid material such as sand, can collect on the insulator's surface. These layers become conducting during periods of high humidity and fog. Sodium chloride is the main constituent of this type of pollution.

Industrial pollution occurs when substations and power lines are located near industrial complexes. The power lines are then subject to the stack emissions from the nearby plants. These materials are usually dry when deposited, then may become conducting when wetted. The materials will absorb moisture to different degrees. Apart from salts, acids are also deposited on the insulator.

Of course, both sources of pollution can exist. For example, if a substation is situated near to the coast, it will be exposed to a high saline atmosphere together with any industrial and chemical pollution from other plants situated in close proximity.

The presence of a conducting layer on the surface of an insulator can lead to pollution flashover. In particular, sufficient wetting of the dry salts on the insulator surface is required to from a conducting electrolyte. The ability of a surface to become wet is described by its hydrophobicity. Ceramic materials and some polymeric materials such as EDPM rubber are hydrophilic, that is, water films out easily on its surface. In the case of some shed materials such as silicone rubber, water forms beads on the surface due to the low surface energy.

When new, the hydrophobic properties of silicone rubber are excellent; however, it is known that severe environmental and electrical stressing may destroy this hydrophobicity.

Current remediation techniques for environmental degradation of a high voltage insulator include washing, greasing and coatings, among others. Substation or line insulators can be washed when de-energized or when energized. Cleaning with water, dry abrasive cleaner, or dry ice can effectively remove loose contamination from insulator, but it is expensive and labor intensive. It is not uncommon that washings involve shutting down the power once every two weeks in winter time and once per week in summer when doing this kind of maintenance. This common occurrence of de-energization simply is not preferable.

Mobile protective coatings, including oils, grease and pastes surface treatment, can prevent flashover, but have damaging results to the insulator during dry band arcing. A thin layer of silicone grease, when applied to ceramic insulators, increases the hydrophobicity of the surface. Pollution particles that are deposited on the insulator surface are also encapsulated by the grease and protected from moisture. A disadvantage of greasing is that the spent grease must be removed and new grease applied, typically annually. Grease-like silicone coating components, usually compounded with alumina tri-hydrate (ATH), provide a non-wettable surface and maintain high surface resistance. Thus, greasing can greatly reduce maintenance costs when viewed against washings, but the substation has to remove the old grease compounds from the equipment, and then re-apply the new grease compound annually.

Fluorourethane coatings were developed for high voltage insulators, but the field test is not successful, and its adhesion to insulators has been a problem.

Since the 1970s, silicone room temperature vulcanizing (RTV) coatings have gained considerable popularity, and become the major products available in the market, such as Dow Corning's SYLGARD High Voltage Insulator Coatings, CSL's Si-Coat HVIC, and Midsun's 570 HVIC. Service experience has indicated that of the various types of insulator coatings, the time between maintenance and RTV coating reapplication is the longest.

Room temperature cured silicone rubber coatings are available to be used on ceramic or glass substation insulators. These coatings have good hydrophobic properties when new. Silicone coatings provide a virtually maintenance-free system to prevent excessive leakage current, tracking, and flashover. Silicone is not affected by ultraviolet light, temperature, or corrosion, and can provide a smooth finish with good tracking resistance.

Silicon coatings are used to eliminate or reduce regular insulator cleaning, periodic re-application of greases, and replacement of components damaged by flashover. They appear to be effective in many types of conditions, from salt-fog to fly ash. They are also useful to restore burned, cracked, or chipped insulators.

SYLGARD is one type of silicone coatings, and is marketed to restrict the rise in leakage currents and protect the insulators against pollution induced flashovers. The cured SYLGARD coating has a high hydrophobicity. This hydrophobic capability is of prime importance because it is this factor that controls the degree of wetting of the contaminants, and thereby the amount of surface leakage current increase. Moisture on the insulator surface will form in droplets and by so doing will prevent the surface pollution from becoming wet and producing a conductive layer of ionisable materials that lead to increased leakage, dry band arcing and eventual flashovers.

In addition, there are a certain percentage of polymer molecules that exist within the cured rubber as low molecular weight free fluid. These molecules are known as "cyclics". The free fluids are easily able to migrate to the surface of the coating and, as pollutants fall on the surface, they in turn are encapsulated and rendered non conductive and somewhat hydrophobic.

If leakage currents are controlled, there will be no arcing. If there is an extreme weather event then it may be that, for a time, the SYLGARD coating cannot control the surface leakage currents. In this case SYLGARD also provides a high degree of surface arc resistance. Incorporated into the formulation is an alumina trihydrate (ATH) filler, which releases $H_2O$ when it becomes hot and consequently resists the degradative effects of high temperatures, resulting from exposure of the coating to arcing.

However, none of the above techniques prevent contamination, such as dust, accumulation on coating surfaces, and none of the above techniques has satisfactory performance in heavy contamination environments.

Although high voltage insulator coatings are known, as discussed above, a need yet exists for a superior product that can minimize the maintenance necessary for conventional coatings. An HVIC that is self-cleaning and has an expected longer life than conventional coatings would be beneficial.

The abovementioned criteria are satisfied in the natural world. The phenomenon of the water repellency of plant leaf surfaces has been known for many years. The Lotus Effect is named after the lotus plant. The Lotus Effect implies two indispensable characteristic properties: superhydrophobicity and self-cleaning. Superhydrophobicity is manifested by a water contact angle larger than 150°, while self-cleaning indicates that particles of dirt such as dust or soot are picked up by the drop of water as they roll off and removed from the surface.

It is recognized that when a water drop is placed on a lotus plant surface, the air entrapped in the nano surface structures prevents the total wetting of the surface, and only a small part of the surface, such as the tip of the nano structures, can contact with the water drop. This enlarges the water/air interface while the solid/water interface is minimized. Therefore, the water gains very little energy through adsorption to compensate for any enlargement of its surface. In this situation, spreading does not occur, the water forms a spherical droplet, and the contact angle of the droplet depends almost entirely on the surface tension of the water.

Although the Lotus Effect was discovered in plants, it is essentially a physicochemical property rather than a biological property. Therefore, it is possible to mimic the lotus surface structure. To mimic the lotus surfaces, a Lotus Effect surface should be produced by creating a nanoscale rough structure on a hydrophobic surface, coating thin hydrophobic films on nanoscale rough surfaces, or creating a rough structure and decreasing material surface energy simultaneously. Up to now, many methods have been developed to produce hydrophobic surfaces with nano-scale roughness.

Thus, surfaces with a combination of microstructure and low surface energy are known to exhibit interesting properties. A suitable combination of structure and hydrophobicity renders it possible that even slight amounts of moving water can entrain dirt particles adhering to the surface and clean the surface completely. It is known that if effective self-cleaning is to be obtained on an industrial surface, the surface must not only be very hydrophobic but also have a certain roughness. Suitable combinations of structure and hydrophobic properties permit even small amounts of water moving over the surface to entrain adherent dirt particles and thus clean the surface. Such surfaces are disclosed in, for example, WO 96/04123 and U.S. Pat. No. 3,354,022).

European Pat. No. 0 933 380 discloses that an aspect ratio of >1 and a surface energy of less than 20 mN/m are required for such self-cleaning surfaces. The aspect ratio is defined to be a quotient of a height of a structure to a width of the structure.

Other prior art references include PCT/EP00/02424, that discloses that it is technically possible to render surfaces of objects artificially self-cleaning. The surface structures, composed of protuberances and depressions, required for the self-cleaning purpose have a spacing between the protuberances of the surface structures in the range of 0.1 to 200 μm and a height of the protuberances in the range from 0.1 to 100 μm. The materials used for this purpose must consist of hydrophobic polymers or a durably hydrophobized material. Detergents must be prevented from dissolving from the supporting matrix. As in the documents previously described, no information is given either on the geometrical shape or radii of curvature of the structures used.

EP 0 909 747 teaches a process for producing a self-cleaning surface. The surface has hydrophobic elevations of height from 5 to 200 μm. A surface of this type is produced by applying a dispersion of powder particles and of an inert material in a siloxane solution, followed by curing. The structure-forming particles are therefore secured to the substrate by an auxiliary medium.

Methods for producing these structured surfaces are likewise known. In addition to molding these structures in a fashion true to detail by way of a master structure using injection molding or by an embossing method, methods are also known which use the application of particles to a surface (e.g. see U.S. Pat. No. 5,599,489). This process utilizes an adhesion-promoting layer between particles and bulk material. Processes suitable for developing the structures are etching and coating processes for adhesive application of the structure-forming powders, and also shaping processes using appropriately structured negative molds.

However, it is common to all these methods that the self-cleaning behavior of these surfaces is described by a very high aspect ratio.

Plasma technologies are widely utilized for processing of polymers, such as deposition, surface treatment and etching of thin polymer films. The advantages of using plasma techniques to prepare the Lotus Effect coating include that plasma technologies have been extensively employed in surface treatment processes in the electronic industry. Fabricating the Lotus Effect coating on various surfaces with plasma can be easily transferred from research to scale up production. Further, plasma-based methods can be developed into a standard continuous/batch process with low cost, highly uniform surface properties, high reproducibility and high productivity.

Exposure to sunlight and some artificial lights can have adverse effects on the useful life of polymer coatings. UV radiation can break down the chemical bonds in a polymer. Since photodegradation generally involves sunlight, thermal oxidation takes place in parallel with photooxidation. The use of antioxidants during processing is not sufficient to eliminate the formation of photoactive chromospheres. UV stabilizers have been applied widely and the mechanism of stabilization of UV stabilizers belong to one or more of the following: (a) absorption/screening of UV radiation, (b) deactivation (quenching) of chromophoric excited states, and (c) free-radical scavengers, and (d) peroxide decomposers.

Since transmission lines are often in remote locations that are hard to reach, it is desirable that once the line has been constructed, it will work satisfactorily, without maintenance, for the expected life of the line, generally exceeding 30 years. Therefore, it can be seen that a need yet exists for a superior HVIC that utilizes a coating surface exhibiting "Lotus Effect" properties, including superhydrophobicity and self-cleaning.

BRIEF SUMMARY OF THE INVENTION

The present invention comprises a method to prepare a superhydrophobic coating with enhanced UV stability as a (super) protective coating for external electrical insulation system applications. Coatings of this type can have a wide range of uses and the substrate to which the same is applied can be many insulating materals, including polymers, ceramics, metals and glass.

In particular, although not necessarily exclusive, by coating and etching polymer coating materials, the present invention provided a method to prepare superhydrophobic coatings and prevent the contamination problems of conventional external electrical insulation systems. The UV stability of the coating systems was improved by various UV stabilizers and UV absorbers.

The present invention utilizes a Lotus Effect coating a protective coating for insulating materials. The protective coating keeps the surface of exterrnal electrical insulation systems dry and clean, thus minimizing chances for surface degradation and surface contaminant-induced breakdown of the insulation systems, thus significantly enhancing their performance.

The present invention employs various plasma and chemical etching techniques to prepare superhydrophobic surfaces. The following polymer photostabilization methods were provided in the present invention to enhance the UV stability of the Lotus Effect coatings.

UV screens: It is evident that opaque pigments can stabilizer the polymer by screening the incident UV photos of high energy.

UV absorbers: A very simple way to protect adhesives against UV light is to prevent UV absorption, i.e. reducing the amount of light absorbed by chromophores. The UV absorbers, such as some orthohydroxybenzophenones derivatives, have a common structure feature that is responsible for their activity as efficient UV stabilizers, namely, a strong intramolecular hydrogen bond. UV absorbers have high extinction coefficient in the 290-400 regions.

Excited-state quenchers: excited-state quenchers interact with an excited polymer atom by indirect energy absorption. The quenchers bring the high-energy chromophore back to ground state by absorbing the energy and then dissipating the energy harmlessly before the energy can degrade. Organometal complexes or chelates such as those based on nickel are most effective.

Hindered amine light stabilizers: Today, the most common category of light stabilizers consists of what are known as hindered amine light stabilizers (abbreviated as HALS). They are derivatives of 2,2,6,6-tetramethyl piperidine and are extremely efficient stabilizers against light-induced degradation of most polymers. HALS does not absorb UV radiation, but acts to inhibit degradation of the polymer. They slow down the photochemically initiated degradation reactions, to some extent in a similar way to antioxidants.

One advantage of the hindered amine light stabilizers is that no specific layer thickness or concentration limits needs to be reached to guarantee good results. Significant levels of stabilization are achieved at relatively low concentrations. HALS' high efficiency and longevity are due to a cyclic process wherein the HALS are regenerated rather than consumed during the stabilization process.

The present invention preferably comprises superhydrophobic coating surfaces as protective coatings for external insulation system applications, and superhydrophobic coating surfaces generally that include UV screens, UV absorbers, UV free-radical scavengers and/or anti-oxidants.

The superhydrophobic coating can include polymer materials, which include homopolymers such as PTFE, polybutadiene, polyisoprene, Parylenes, polyimide, silicones, and copolymers such as PBD, ABS, polybutadiene-block-polystyrene, silicone-polyimides. The polymer materials can further include unsaturated bonds of polybutadiene or polyisoprene and their copolymers.

The polymer materials can be applied by any or any combination of spin coating, solvent casting, dipping, spraying, plasma deposition or chemical vapor deposition.

The superhydrophobic coating can comprise UV screens, UV absorbers, UV free-radical scavengers and anti-oxidants, preferably with a loading level of 0.01-20 wt. %.

The UV screens can include one or a combination of carbon black, titanium dioxide, barium, zinc oxide, and colored pigments include iron oxide red and copper and all transition metal phthalocyanines.

The UV absorbers can include one or a combination of substituted benzophenones and benzotriazoles, plus others such as cyanoacrylate derivatives, salicylates, and substituted oxanilides The UV free-radical scavengers can include one or a combination of free-radical scavengers such as esters of 3,5-di-t-butyl-4-hydroxybenzoic acid and derivatives of 3,5,-di-t-butyl-4-hydroxy-benzyl-phosphonic acid and other hindered amine light stabilizers.

The anti-oxidants can include one or a combination of chain-breaking antioxidants such as hindered phenols or alkylarylamines, peroxide-decomposing antioxidants such as organosulfur compounds, metal deactivators, and color inhibitors such as tertiary phosphates or phosphonates.

The superhydrophobic coating can be applied on many surfaces, such as metal, glass, ceramics, semiconductors, flexible surface such as paper and textiles and polymers.

The superhydrophobic surface preferably incorporates an irregular surface structure that is produced by plasma such as those generated by radio frequency, microwaves and direct current. The plasma may be applied in a pulsed manner or as continuous wave plasma. Typically, the plasmas can be operated at any or any combination of low pressure, atmospheric or sub-atmospheric pressures.

Compared with silicone high voltage insulating coatings, the present Lotus Effect HVIC has the following advantages, among others,

- a higher surface hydrophobicity to repel water;
- due to its self-cleaning property, contaminants cannot accumulate on its surface, therefore, it eliminates the danger of arcing and flashover;
- it eliminates the need for repeated water washing or greasing, which results in significant savings in maintenance and replacement costs;
- because it does not contain Alumina Hydrate particles as a filler as other HVICs, it prevents dry band arcing and performs better in contaminated conditions.

Thus, one objective of the present invention, therefore, is to provide a self-cleaning superhydrophobic surface on external insulation systems to prevent contamination problems, and to provide a process for its production. The nanoscale structure and low surface energy of the superhydrophobic coating reduce the adhesion between dust particles and the coating surface, and the dust particles can be removed by water droplet when it rains. Therefore the contamination problem of insulating materials will be prevented.

Another objective of the invention is to provide superhydrophobic coating systems that have good stability under UV exposure. Various UV stabilizers and UV absorbers were incorporated into the coating systems to enhance their UV stability while maintaining its superhydrophobicity.

These and other objects, features and advantages of the present invention will become more apparent upon reading the following specification in conjunction with the accompanying drawing figures.

DETAILED DESCRIPTION OF PREFERRED EMBODIMENTS

The present invention preferably provides a surface which has an artificial surface structure and low surface energy. While the present invention preferably comprises systems and methods for providing a self-cleaning superhydrophobic surface on high voltage insulators used with transmission and distribution systems, the invention can be used in other environments.

The present invention further comprises superhydrophobic coating systems that have good stability under UV exposure, for use not just in the voltage insulators used with transmission and distribution systems. A superhydrophobic coating system comprising UV stabilizers and/or UV absorbers is disclosed.

Figure 1:
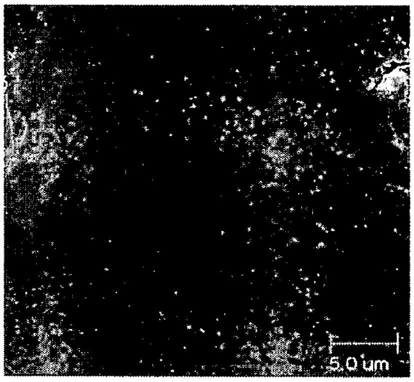
FIG. 1 is a SEM image of PTFE, wherein untreated, the water contact angle is 113°.
Figure 2:
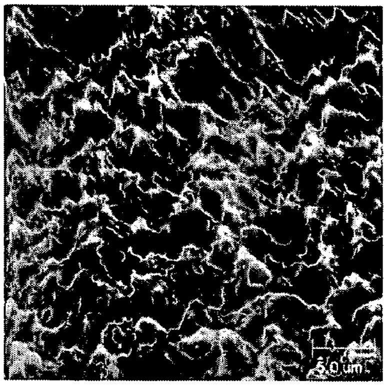
FIG. 2 is a SEM image of oxygen plasma etched PTFE, etched for approximately 15 minutes, wherein the water contact angle is 150°.
Figure 3:
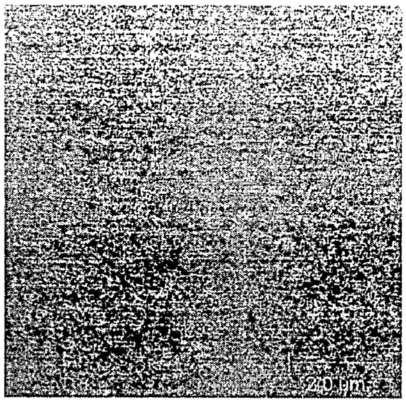
FIG. 3 is a SEM image of polybutadiene, untreated
Figure 4:
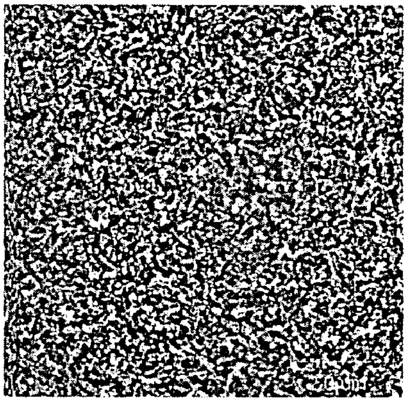
FIG. 4 is a SEM image of $SF_6$ plasma etched polybutadiene, etched for approximately 10 minutes.

FIGS. 1 and 2 show the micro structure on PTFE surface after oxygen plasma etching, which enhances the surface hydrophobicity and reduces the adhesion between dust particles and PTFE surface. FIGS. 3 and 4 show the nanoscale structure on polybutadiene surface after $SF_6$ plasma etching. The water contact angle on this surface is above 160°.

Surfaces that are rough tend to be more hydrophobic than smooth surfaces, because air can be trapped in the fine structures, and reduce the contact area between the water and solid. The self-cleaning property of a Lotus Effect surface indicates that particles of dirt such as dust or soot are picked up by a drop of water as they roll off and are removed from the surface.

Self-cleaning is determined by the adhesion force between particles and Lotus Effect surface and the surface wetting properties. When a water droplet rolls over a particle, the surface area of the droplet exposed to air is reduced and energy through adsorption is gained. The particle is removed from the surface of the droplet only if a stronger force overcomes the adhesion between the particle and the water droplet. On a given surface, this is the case if the adhesion between the particle and the surface is greater than the adhesion between the particle and the water droplet. If the water droplet easily spreads on the surface (low water contact angle), the velocity of the droplet running off a surface is relatively low. Therefore, particles are mainly displaced to the sides of the droplet and re-deposited behind the droplet, but not removed. If the water droplet does not spread on the surface (high water contact angle), the water runs off the surface with considerable velocity. It is very likely that particles are carried along with the moving liquid front, a mechanism that was also presumed responsible for the removal of microorganisms from leaf surfaces.

Depending on the hydrophobicity of surface materials and the type of surface structures, the structure scale of Lotus Effect surfaces range from nano to micrometers. For the present invention, to achieve the self-cleaning action of dust particles, the hydrophobic surface preferably should have a surface structure from 50 nm to 200 μm, preferably from 100 nm to 20 μm.

Lotus Effect surfaces can be prepared by several approaches. Typically, the polymer material can be applied in any conventional manner to suit particular method requirements and, for example, can include applications by spin coating, solvent casting, dipping spraying, plasma deposition or chemical vapor deposition.

The polymer material can comprise a number of components, including but not limited to, homopolymer and copolymers. These polymeric components may occur singly, in combination with one another, or in the presence of non-polymeric additives. The components of polymer blends may be miscible or immiscible. The polymer material can be fluorinated polymer, such as PTFE, or includes unsaturated bonds that can be fluorinated by following plasma treatment. Two such polymers are polybutadiene and polyisoprene. In addition, the coating may comprise additional layers, supplementary to the outermost surface layer, which can consist of any combination of materials.

The superhydrophobic surface of the coating can be achieved by plasma etching. Suitable plasmas for use in the method of the invention include non-equilibrium plasma such as those generated by radio frequency or microwaves. The plasma may be applied in pulsed manner or a continuous manner. The etching gas for PTFE is oxygen and the etching gases for other polymer materials containing unsaturated bonds are $SF_6$, $CHF_3$ or $CF_4$.

In another preferred embodiment of the present invention, a Lotus Effect coating can be fashioned by suspending inert micro (5-200 micrometers) particulates, which can be, for example, PTFE, PP, PE, ceramic or clay, in various silicon-solvent solutions. The solvents used can be common solvents, such as 1-methoxy-2-propanol. The concentration of the inert particulates can be 5-30 wt %, and the concentration of silicon can be 1-20 wt %.

The suspensions are then spin or spray coated on various insulating materials. Following a curing processing of the silicon materials (depending on the silicon materials, the curing temperature varies from room temperature to 150 degree C.), the micro particulates were fixed on surface and give superhydrophobicity.

Exposure to sunlight and some artificial lights can have adverse effects on the useful life of coating materials. UV radiation can break down the chemical bonds in a polymer. This process is called photodegradation and ultimately causes cracking, chalking, color changes and the loss of physical properties. Since photodegradation generally involves sunlight, thermal oxidation takes place in parallel with photooxidation. To counteract the damaging effect of UV light, UV stabilizers are used to solve the degradation problems associated with exposure to sunlight. The present invention provides a method to integrate various UV absorbers and UV stabilizers into the coating systems to enhance their UV stability while maintaining their superhydrophobicity.

For the present invention, single photostabilization method or a combination of different photostabilization stabilizers were employed. Preferably, UV stabilizers and anti-oxidants are dissolved in solvent and mixed with polybutadiene solutions. The solution that contains polybutadiene and UV stabilizers are spin/dip coated on insulating materials, and etched with plasma. The preferable concentration of UV stabilizers and anti-oxidants is 0.01 to 20 wt % in the coatings after drying in air.

A superhydrophobic and self-cleaning Lotus Effect coating is invaluable to high voltage applications, because it prevents the accumulation of contaminants on the surface of the insulators, which can produce a conductive layer when wet, and then lead to an increase in leakage currents, dry band arcing, and ultimately flashover. The present coating also offers resistance to atmospheric and chemical degradation (the coated insulators remain unaffected by salt air, airborne pollutants, rain or humidity). Lotus Effect coatings also exhibits high-tracking resistance to reduce damage during salt storms or other severe contamination events. It can be used in applications including: glass, porcelain and composite insulators where improved surface dielectric properties are needed, line and station insulators, as well as bushings, instrument transformers and related devices, as well as other applications requiring tracking resistance.

COMPARATIVE EXAMPLES

Example 1

PTFE, also known as Teflon (trademark by DuPont), has outstanding properties. PTFE is non-sticky; very few solid substances can permanently adhere to a PTFE surface. It has a low coefficient of friction (the coefficient of friction of PTFE is generally in the range of 0.05 to 0.20). In addition, it has good heat and chemical resistances. It also has good cryogenic stability at temperatures as low as −270° C.

Coating PTFE on various surfaces, such as glass, ceramic and metal, has become a mature industrial process. Lotus Effect surfaces created by plasma etching of PTFE combine superhydrophobicity with the excellent properties of PTFE coatings and can withstand harsh environmental conditions. The preferable etching gas is oxygen. The preferable etching resonant frequency is from 100 K to 13.6 MHz. The preferable etching power is from 20 W to 300 W. The preferable etching time is from 5 minutes to 30 minutes.

During plasma treatment, the needle-like structures appeared and the void increased between the needle-like structures. Such a surface morphology entraps air bubbles and reduces the wetting area on the surface when it comes in contact with water drops, therefore increasing the surface hydrophobicity.

As an example, PTFE nonstick coatings are prepared on insulating materials by a two-coat (primer/topcoat) system. Oxygen plasma etching experiments were performed by using a radio-frequency Reactive Ion Etcher (RIE). The specimens were placed on a horizontal metal support. The reactor chamber was purged with oxygen and evacuated to 2 mTorr twice, to remove nitrogen from the chamber before the plasma treatment. The plasma parameters were as follows: resonant frequency 13.6 MHz, power 100 W, pressure 150 mTorr, and oxygen gas flow 8 sccm. The plasma treatment time is 15 minutes. Superhydrophobic PTFE coatings with water contact angle above 150° were prepared.

FIGS. 1 and 2 show the surface morphology of the etched PTFE coatings.

Example 2

The Lotus Effect coating can also be produced by plasma fluorination of polybutadiene films. The C═C bonds on the surface can be easily activated and fluorinated. Polybutadiene is a relatively inexpensive material compared with other materials and it can be easily applied to metal, glass, ceramics, semiconductors, paper, textile, and other polymeric surfaces. Polybutadiene was dissolved in solvent and spin/dip coated onto insulating materials. The coatings were dried in air and etched with plasma to prepare superhydrophobic surfaces. Polybutadiene films are thermal or UV curable after fluorination and their surface hardness increases with better durance and reliability, while maintaining the surface superhydrophobicity.

The coating thickness was adjusted by controlling polybutadiene solution concentration and the rotation speed of spin coating. The preferable thickness of the coating is from 200 nm to 50 μm. The preferable etching gas is $SF_6$. The preferable etching resonant frequency is 13.6 MHz. The preferable etching power is from 20 W to 300 W. Superhydrophobic coating with water contact angle between 155° to 170° can be prepared with this method.

The polybutadiene was dissolved in toluene at 10 wt %, and the solution was then spin-coated on glass and silicon substrates. The thickness of the films was about 5 μm. and it can be controlled by controlling the solution concentration and spin coating processes. These films were subsequently annealed at 90° C. under vacuum for 60 min to remove the solvent. Reactive Ion Etching (RIE) of three different gases ($CF_4$, $CHF_3$, $SF_6$), and Inductive Coupled Plasma (ICP) of $CF_4$ were employed to treat the polybutadiene films. A stable porous surface with water contact angle above 160° was obtained, and a small sliding angle was also observed. The surfaces were subsequently cured in air at 150° for 1 hour. The SEM images of $SF_6$ etched polybutadiene thin films are shown in FIGS. 3 and 4.

Example 3

Single or a combination of UV stabilizers was dissolved in the polybutadiene and toluene solution in Example 2. The polybutadiene and UV stabilizer solution was dip/spin coated on insulating materials to form thin film coatings. These films were subsequently annealed at 90° C. under vacuum for 60 min to remove the solvent. The preferable concentration of UV stabilizer is from 0.01 to 20 wt %. Reactive Ion Etching (RIE) of three different gases ($CF_4$, $CHF_3$, $SF_6$), and Inductive Coupled Plasma (ICP) of $CF_4$ were employed to treat the films, and superhydrophobic surface were prepared.

What is claimed is:

1. In a power line system of the type that provides power to different locales via suspension above ground, the improvement comprising a coating covering the surface of at least a portion of the line, the coating having a superhydrophobic surface having a contact angle greater than 150 degrees, the surface structure of the coating comprising elevations and depressions, wherein distances between elevations are in the range 5-200 μm, and heights of the elevations are in the range 5-100 μm, and wherein a plurality of micro particulates ranging from about 5 to about 200 micrometers form the elevations and depressions so the surface structure is irregular.

2. The power line system of claim 1, the superhydrophobic surface being a self-cleaning surface.

3. The power line system of claim 1, the coating comprising an inorganic material, homopolymer and a copolymer.

4. The power line system of claim 3, the homopolymer selected from the group consisting of PTFE, polybutadiene, polyisoprene, and polyimides.

5. The power line system of claim 3, the copolymer selected from the group consisting of PBD, ABS, polybutadiene-block-polystyrene, and silicone-polyimides.

6. The power line system of claim 1, the coating comprising a UV screen.

7. The power line system of claim 6, the UV screen selected from the group consisting of carbon black, titanium dioxide, barium, zinc oxide, and colored pigments.

8. The power line system of claim 1, the coating comprising a UV absorber.

9. The power line system of claim 8, the UV absorber selected from the group consisting of benzophenones, benzotriazoles, cyanoacrylate derivatives, salicylates, and substituted oxanilides.

10. The power line system of claim 1, the coating comprising a UV free-radical scavenger.

11. The power line system of claim 10, the UV free-radical scavenger selected from the group consisting of esters of 3,5-di-t-butyl-4-hydroxybenzoic acid, derivatives of 3,5,-di-t-butyl-4-hydroxy-benzyl-phosphonic acid and hindered amine light stabilizers.

12. The power line system of claim 1, the coating comprising an anti-oxidant.

13. The power line system of claim 12, the anti-oxidant selected from the group consisting of hindered phenols, alkylarylamines, organosulfur compounds, metal deactivators, tertiary phosphates and phosphonates.

14. The power line system of claim 1, the distances between elevations are in the range 10-100 μm, and the heights of the elevations are in the range 10-50 μm.

15. In a power line system of the type that provides power to different locales via suspension above ground, the improvement comprising a coating covering the surface of at least a portion of the line, the coating having a superhydrophobic surface with a water contact angle larger than 150 degrees, and wherein a plurality of suspended micro particulates ranging from about 5 to about 200 micrometers form elevations and depressions in the superhydrophobic surface such that surface has an irregular structure.

16. The power line system of claim 15, the surface structure of the coating comprising protuberances having a mean height of 50 nm to 200 μm and a mean spacing of 50 nm to 200 μm.

17. The power line system of claim 15, the surface structure of the coating comprising elevations and depressions, wherein distances between elevations are in the range 5-200 μm, and heights of the elevations are in the range 5-100 μm.

18. The power line system of claim 17, the distances between elevations are in the range 10-100 μm, and the heights of the elevations are in the range 10-50 μm.

19. The power line system of claim 15, the superhydrophobic surface being a self-cleaning surface.

20. The power line system of claim 15, the coating comprising an inorganic material, homopolymer and a copolymer.

21. The power line system of claim 20, the homopolymer selected from the group consisting of PTFE, polybutadiene, polyisoprene, and polyimides.

22. The power line system of claim 20, the copolymer selected from the group consisting of PBD, ABS, polybutadiene-block-polystyrene, and silicone-polyimides.

23. The power line system of claim 15, the coating comprising a UV screen.

24. The power line system of claim 23, the UV screen selected from the group consisting of carbon black, titanium dioxide, barium, zinc oxide, and colored pigments.

25. The power line system of claim 15, the coating comprising a UV absorber.

26. The power line system of claim 24, the UV absorber selected from the group consisting of benzophenones, benzotriazoles, cyanoacrylate derivatives, salicylates, and substituted oxanilides.

27. The power line system of claim 15, the coating comprising a UV free-radical scavenger.

28. The power line system of claim 27, the UV free-radical scavenger selected from the group consisting of esters of 3,5-di-t-butyl-4-hydroxybenzoic acid, derivatives of 3,5,-di-t-butyl-4-hydroxy-benzyl-phosphonic acid and hindered amine light stabilizers.

29. The power line system of claim 15, the coating comprising an anti-oxidant.

30. The power line system of claim 29, the anti-oxidant selected from the group consisting of hindered phenols, alkylarylamines, organosulfur compounds, metal deactivators, tertiary phosphates and phosphonates.

31. In a power line system of the type that provides power to different locales via suspension above ground, the improvement comprising a coating covering the surface of at least a portion of the line, the surface having a contact angle greater than 150 degrees, the surface structure of the coating comprising protuberances having a mean height of 50 nm to 200 μm and a mean spacing of 50 nm to 200 μm, and wherein a plurality of suspended micro particulates ranging from about 5 to about 200 micrometers form the elevations and depressions so the surface structure is irregular.

32. The power line system of claim 31, the superhydrophobic surface being a self-cleaning surface.

33. The power line system of claim 31, the coating comprising an inorganic material, homopolymer and a copolymer.

34. The power line system of claim 33, the homopolymer selected from the group consisting of PTFE, polybutadiene, polyisoprene, and polyimides.

35. The power line system of claim 33, the copolymer selected from the group consisting of PBD, ABS, polybutadiene-block-polystyrene, and silicone-polyimides.

36. The power line system of claim 31, the coating comprising a UV screen.

37. The power line system of claim 36, the UV screen selected from the group consisting of carbon black, titanium dioxide, barium, zinc oxide, and colored pigments.

38. The power line system of claim 31, the coating comprising a UV absorber.

39. The power line system of claim 38, the UV absorber selected from the group consisting of benzophenones, benzotriazoles, cyanoacrylate derivatives, salicylates, and substituted oxanilides.

40. The power line system of claim 31, the coating comprising a UV free-radical scavenger.

41. The power line system of claim 40, the UV free-radical scavenger selected from the group consisting of esters of 3,5-di-t-butyl-4-hydroxybenzoic acid, derivatives of 3,5,-di-t-butyl-4-hydroxy-benzyl-phosphonic acid and hindered amine light stabilizers.

42. The power line system of claim 31, the coating comprising an anti-oxidant.

43. The power line system of claim 42, the anti-oxidant selected from the group consisting of hindered phenols, alkylarylamines, organosulfur compounds, metal deactivators, tertiary phosphates and phosphonates.

* * * * *